UNITED STATES PATENT OFFICE.

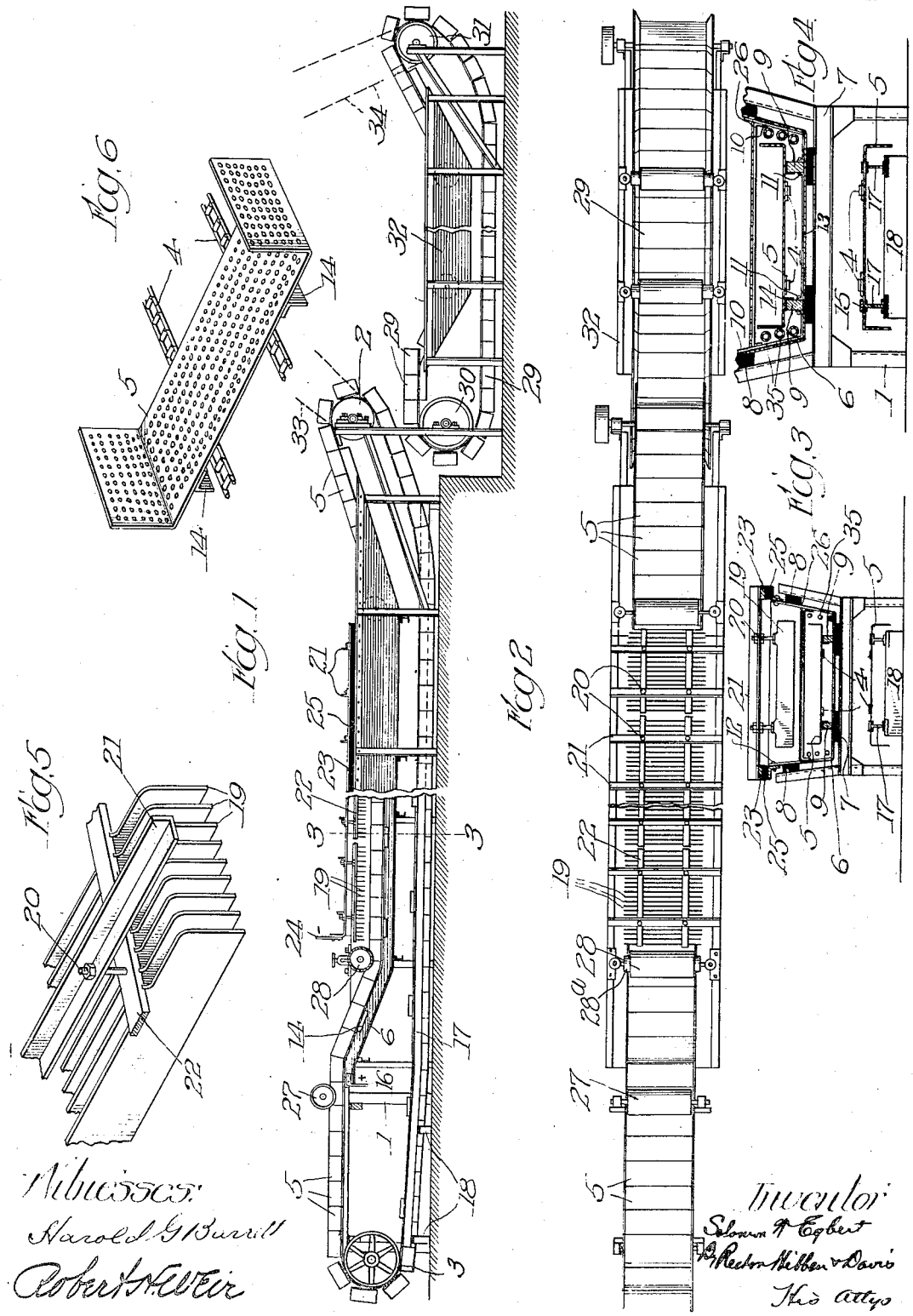

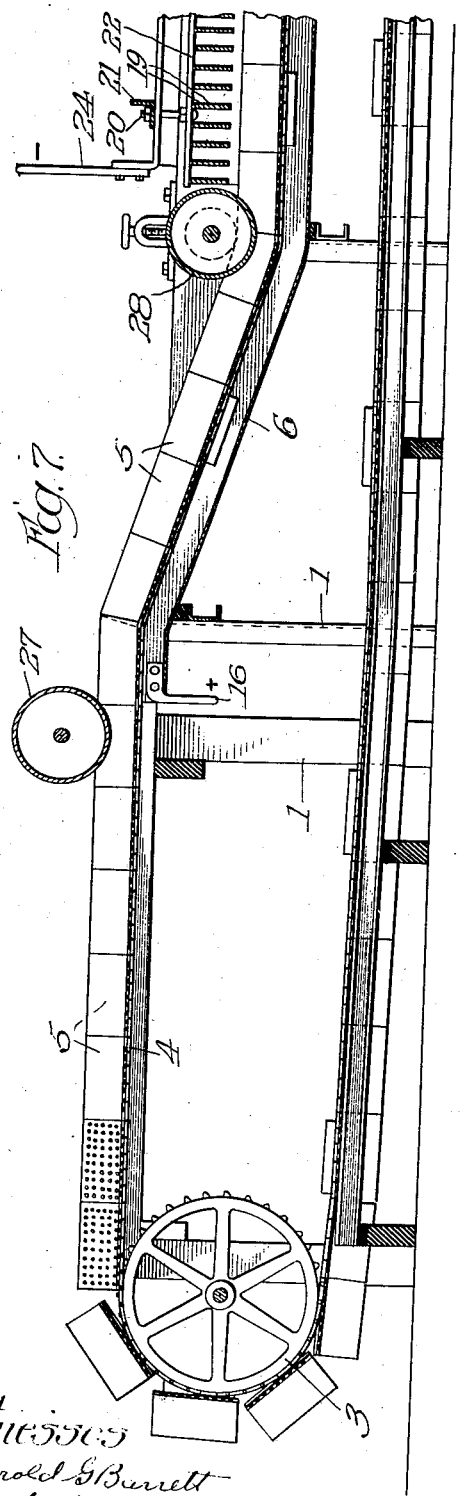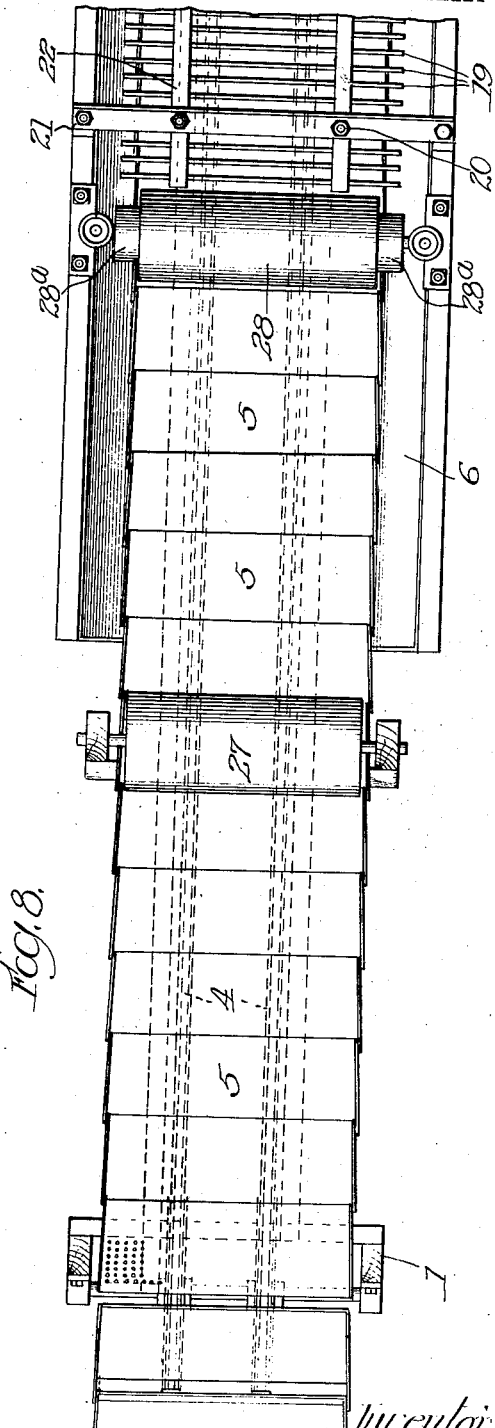

SOLOMON W. EGBERT, OF JOLIET, ILLINOIS.

APPARATUS FOR RECOVERING MATERIAL FROM SCRAP METAL.

945,024.  Specification of Letters Patent.  Patented Jan. 4, 1910.

Application filed March 29, 1909. Serial No. 486,596.

*To all whom it may concern:*

Be it known that I, SOLOMON W. EGBERT, a citizen of the United States, residing at Joliet, in the county of Will and State of Illinois, have invented certain new and useful Improvements in Apparatus for Recovering Material from Scrap Metal, of which the following is a specification.

My invention relates to apparatus for recovering material from scrap or waste metals such as the recovering of tin from scrap tin cans, cuttings, zinc-coated sheets and cuttings, etc., and the object thereof is to provide an apparatus of this character of novel construction and mode of operation.

Speaking in general terms my apparatus consists of an endless conveyer for passing the scrap through a suitable electrolyte in which the material to be recovered is decomposed and collected on a cathode, by an electric current, after which the waste material is in practice discharged on a similar conveyer and carried through a washing or rinsing bath and finally discharged from the apparatus and eventually made into bundles in the usual and well-known way. In the use of my apparatus the material is recovered and collected in practically pure form and unmixed with dirt or foreign substances and moreover the arrangement is such that the work is continuous and comparatively rapid so that a large amount of scrap may be quickly and efficiently operated upon by the machine.

Other novel and advantageous features of construction and mode of operation will be apparent from the description hereinafter given.

In the drawings Figure 1 is a side elevation of a complete machine including the rinsing apparatus; Fig. 2 a plan view thereof; Fig. 3 a cross section on the line 3—3 of Fig. 1; Fig. 4 a detail view on a larger scale of certain parts illustrated in Fig. 3; Fig. 5 a perspective of a portion of the group of cathodes; Fig. 6 a perspective of one of the buckets or carrier sections of the endless conveyer; Fig. 7 an elevation of a portion of the machine illustrated in Fig. 1 but made on a larger scale; and Fig. 8 a plan view of the portion of the machine illustrated in Fig. 7.

Although my machine is more particularly employed in the recovery of tin from waste or scrap metal such as tin cans, plate, cuttings and strips and also zinc-coated sheets, cuttings, etc., yet it will be understood that the machine may be employed for the recovery of other metals or their salts and combinations without change in the construction of the machine or at least substantial change and it will therefore be understood that while for the sake of a clear and definite description of my invention I may hereinafter refer to tin as the material recovered it will be understood that I do not so limit myself but contemplate using my invention wherever applicable.

Referring to the present embodiment of my invention as shown in the drawings the apparatus is provided with a frame 1 of suitable construction but preferably made of wood as to the left hand portion thereof shown in Fig. 1 in order to insulate the endless conveyer at this point. At the ends of this frame are journaled the sprocket wheels 2 and 3 over which run an endless conveyer of novel construction and adapted for the particular purposes in view. In the present instance this conveyer comprises a pair of sprocket chains 4 and a series of carrier sections 5 which for convenience may be termed buckets, each of which consists of a flat horizontal base section, secured to the sprocket chains in suitable manner, and right-angled end flanges. By preference the material of these buckets are suitably perforated for the free access of the electrolyte while traveling through the tank hereinafter described. In practice and by preference as shown in Fig. 8 the adjoining buckets slightly overlap with the result that when the same are traveling along a straight line they form a continuous endless carrier, the same opening at the sides only when they pass over the sprocket wheels.

The tank 6 for containing the electrolyte, which may be of any desired chemical solution, is of suitable shape and dimensions having inclined end portions and a horizontal intermediate or bottom portion, the same being suitably mounted and supported in the frame 1 of the machine. Inasmuch as this tank, and its contents and the conveyer track and the endless conveyer, constitute the anode of the apparatus it is suitably insulated from the frame, being insulated by any suitable material at its bottom and sides as indicated at 7 and 8 respectively, Fig. 3.

On its upper reach the endless conveyer travels upon the left-hand end of the frame and through the tank upon suitable rails, contact being thereby had between the conveyer and the tank itself and provision being made for keeping the conveyer in line during its travel through the tank. To this end such frame and tank are provided with parallel rails 9, 9 as illustrated in Fig. 3 and as shown more in detail in Fig. 4. In practice these rails 9, which are of metal, rest upon the bottom of the tank and are secured in place by means of similar bars 10, 10 suitably flanged and secured to said rails as by means of the rivets or bolts 11 and also by preference extending upwardly to the top of the tank and secured thereto by rivets or bolts 12. These rails by preference are also supported and braced by the bar 13 flanged at its ends and secured to the inner sides of said rails by the same bolts 11 hereinbefore referred to. Some of the buckets, in the present instance every fourth bucket, is provided on what is its underside on the upper reach of the conveyer with angle irons 14 which coöperate with the tracks 9 and serve to keep the conveyer in line in its travel, the others of the buckets being provided with merely a flat plate 15 adapted to contact with and slide along the rails 9. The tank, which with other parts constitutes the anode, is provided with a suitable anode connection here located at 16, Fig. 1. By preference rails 17 are provided for supporting the conveyer on its lower reach, such rails being mounted upon a wooden support 18 for insulation purposes or insulated from such support if made of any other material, the object being to insulate the conveyer properly for the purposes in view.

The cathode consists solely of a series or group of parallel strips or bars 19 of suitable material and held suspended in the upper part of the electrolyte. In the present instance these bars are placed transversely of the line of travel of the conveyer and are suspended by means of the bolts 20, the supporting bars 21 and the cross strips 22, which are secured directly to the upper edges of said cathode bars, said parts serving also as conductors for the electric current. As shown in the drawings the supporting bars 21 rest at their ends upon the conductors 23 having the cathode connection 24 as indicated in Fig. 1, these conductors being supported by the upper edges of the tank by insulating material 25 which in practice consists of wood strips. By preference these cathodes are constructed in sections of convenient size to be readily handled with the result that one of the sections can be removed from the tank and the tin scraped off without interrupting the continuity of the process in any way. Moreover, the cathode bars constitute the sole cathode and as the tank itself is part of the anode the tin cannot collect thereon as in other apparatus, requiring the cleaning of the reclaimed tin from the sides of the tank and the consequent interruption of the process. For reasons hereinafter stated I prefer to suspend these cathode bars in the upper part of the electrolyte but so far as my invention in its broader aspect is concerned they may be otherwise located therein.

As clearly shown in Fig. 3 the endless conveyer travels through the lower portion of the tank while the cathode bars are suspended in the upper portion thereof. In order to prevent any possibility of the scrap metal coming into contact with the cathode bars to cause short circuiting or injury thereto I interpose between the cathode bars and conveyer a suitable screen 26 which is secured along its longitudinal edges to opposite sides of the tank.

Describing the operation of my machine, the scrap or waste material is introduced into the buckets of the endless conveyer at the left-hand end of the upper reach thereof, Fig. 1, and in order to level the same and press it downwardly into such buckets I employ a transverse cylindrical roller 27 projecting slightly below the top plane of such buckets as indicated in Fig. 1. The loaded buckets in their travel, after being thus leveled, pass forward and enter the tank at its inclined left-hand end, Fig. 1, and pass below a second roller 28 which has the same functions as the other roller and the additional function of holding the conveyer to the bottom of the tank, for which latter function such roller has reduced end portions 28ᵃ adapted to bear upon the upper edges of the end flanges of the bucket, the body portion of such roller extending downwardly into the buckets in the same manner as the other roller 27. The buckets now pass forwardly through the tank with their under portions or rather their strips or angle bars 14 and 15 in contact with the rails 9 and sliding thereupon. The tin or other material to be recovered from the waste or scrap is electrolytically dissolved and deposited upon the cathode bars, which, being in the upper portion of the tank and free from the dirt and other foreign substances and alone forming the cathode, collect such material in pure form or at least in practically pure combinations. In practice the travel of the endless conveyer is a continuous one and the speed is such as to enable the solution to efficiently decompose the material and permit its collection on the cathode bars after which the endless conveyer leaves the tank at the other or right-hand end of the apparatus or machine, (Fig. 1). By preference and to lessen the amount of handling of the material the conveyer is adapted to discharge the waste or scrap material from the recovering apparatus directly to the washing or rinsing apparatus shown at the right-hand end of Fig. 1 wherein the scrap is washed free from the chemicals and further recovery had of any of the tin or other material to be recovered which had not been transferred to and collected by the cathode bars. As herein shown the rinsing device consists of an endless conveyer 29 which by preference has the same character of buckets as the conveyer of the other apparatus, the same traveling over suitable sprocket wheels or rolling supports 30 and 31, one of which, such as the latter one, being the power wheel. This latter conveyer is adapted to enter the washing and rinsing tank 32 for the purposes stated, after which such scrap is eventually discharged and afterward compressed and bundled up in the usual and well-known way.

It will be understood that the recovering apparatus and the rinsing apparatus may be driven in unison in any suitable and by any desired prime mover. If desired the sprocket wheels 2 and 31 may be the driving wheels of said apparatus and the same may be driven by the sprocket chains 33 and 34 from a single line shaft (not shown). Also, if desired the electrolyte may be heated in suitable manner as by means of the steam pipes indicated at 35.

By the use of my apparatus I am enabled to recover material from scrap or waste in a very simple but most efficient manner and to collect such material in a practically pure form or combination and without contamination with impurities or foreign substances in the scrap. Moreover, all of the work is done in practically a horizontal plane, thereby handling the material with great economy.

I claim:

1. In a machine of the class described, the combination of a tank adapted to contain an electrolyte, an endless trough conveyer which is arranged to support and carry the scrap through the electrolyte and act as the anode, and a cathode in said electrolyte.

2. In a machine of the class described, the combination of a tank adapted to contain an electrolyte, an endless conveyer which is arranged to support and carry the scrap therethrough and to act as the anode, said tank being constructed to permit the conveyer to travel in practically a horizontal plane therein, and a cathode in said electrolyte.

3. In a machine of the class described, the combination of a tank adapted to contain an electrolyte, an endless conveyer which is arranged to support and carry the scrap therethrough and to act as the anode, said tank having inclined ends where the conveyer enters and leaves the same, and a cathode in said electrolyte.

4. In a machine of the class described, the combination of a tank adapted to contain an electrolyte, an endless conveyer which is arranged to support and carry the scrap therethrough and to act as the anode, a cathode in said electrolyte, and means for leveling and compressing the scrap before entering the electrolyte.

5. In a machine of the class described, the combination of a tank adapted to contain an electrolyte, an endless conveyer which is arranged to support and carry the scrap therethrough, and to act as the anode, a cathode in said electrolyte, and a roller for leveling and compressing the scrap before entering the electrolyte.

6. In a machine of the class described, the combination of a tank adapted to contain an electrolyte, an endless conveyer which forms the anode and is arranged to support and carry the scrap therethrough, a cathode in said electrolyte, a roller for leveling and compressing the scrap in the conveyer, and a second roller having similar functions and also adapted to hold the conveyer in place at the bottom of the tank.

7. In a machine of the class described, the combination of a tank adapted to contain an electrolyte, an endless conveyer which forms the anode and is arranged to support and carry the scrap therethrough, and a cathode projecting into the upper portion of the electrolyte above the conveyer.

8. In a machine of the class described, the combination of a tank adapted to contain an electrolyte, an endless conveyer which forms the anode and is arranged to support and carry the scrap therethrough, and a cathode consisting of a series of bars suspended into the upper portion of the electrolyte above the conveyer.

9. In a machine of the class described, the combination of a tank adapted to contain an electrolyte, an endless conveyer which forms the anode and is arranged to support and carry the scrap therethrough, and a cathode consisting of a series of bars suspended into the upper portion of the electrolyte above the conveyer, and arranged in separately removable sections.

10. In a machine of the class described, the combination of a tank adapted to contain an electrolyte, an endless conveyer which forms the anode and is arranged to support and carry the scrap therethrough, a cathode projecting into the upper portion of the electrolyte above the conveyer, and means for preventing the scrap from coming into contact with the cathode.

11. In a machine of the class described, the combination of a tank adapted to contain an electrolyte, an endless conveyer which forms the anode and is arranged to support and carry the scrap therethrough, a cathode projecting into the upper portion of the bath above the conveyer, and means for preventing the scrap from coming into contact with the cathode, and consisting of a screen interposed between the conveyer and cathode.

12. In a machine of the class described, the combination of a tank adapted to contain an electrolyte, an endless trough conveyer which is arranged to support and carry the scrap therethrough, and a cathode in said electrolyte, said tank and conveyer being insulated to form the anode.

13. In a machine of the class described, the combination of a tank adapted to contain an electrolyte, an endless trough conveyer which forms the anode and is arranged to support and carry the scrap therethrough, said conveyer being composed of a series of buckets joined together in endless succession, and a cathode in said electrolyte.

14. In a machine of the class described, the combination of a tank adapted to contain an electrolyte, an endless conveyer which forms the anode and is arranged to support and carry the scrap therethrough, said conveyer being composed of a series of buckets joined together in endless succession and overlapping to form a continuous pocket or channel for the scrap on straight stretches, and a cathode in said electrolyte.

15. In a machine of the class described, the combination of a tank adapted to contain an electrolyte, an endless trough conveyer which forms the anode and is arranged to support and carry the scrap therethrough, said conveyer being composed of a series of buckets formed of perforated material and joined together in endless succession, and a cathode in said electrolyte.

16. In a machine of the class described, the combination of a tank adapted to contain an electrolyte, an endless trough conveyer which forms the anode and is arranged to support and carry the scrap therethrough, said conveyer being composed of a series of buckets joined together in endless succession, each bucket being formed of perforated material with a bottom portion and angular end portions, and a cathode in said electrolyte.

17. In a machine of the class described, the combination of a tank adapted to contain an electrolyte, rails therein, an endless conveyer which forms the anode and is arranged to support and carry the scrap therethrough, such conveyer being composed of a series of buckets joined together in endless succession and having plates coöperating with and sliding upon said rails, and a cathode in said electrolyte.

18. In a machine of the class described, the combination of a tank adapted to contain an electrolyte, rails therein, an endless conveyer which forms the anode and is adapted to support and carry the scrap therethrough, such conveyer being composed of a series of buckets joined together in endless succession, some of the buckets having angle plates coöperating with the rails to keep the conveyer in line, and a cathode in said electrolyte.

19. In a machine of the class described, the combination of a tank adapted to contain an electrolyte, rails therein, an endless conveyer which forms the anode and is adapted to support and carry the scrap therethrough, such conveyer being composed of a series of buckets joined together in endless succession, some of the buckets having angle plates coöperating with the rails to keep the conveyer in line and others thereof having plain plates coöperating with and sliding upon said rails, and a cathode in said electrolyte.

20. In a machine of the class described, the combination of a tank adapted to contain an electrolyte, an endless conveyer which forms the anode and is arranged to support and carry the scrap therethrough, a cathode in said electrolyte, and a rinsing apparatus into which said conveyer discharges.

21. In a machine of the class described, the combination of a tank adapted to contain an electrolyte, an endless conveyer which forms the anode and is arranged to support and carry the scrap therethrough, a cathode in said electrolyte, and a rinsing apparatus into which said conveyer discharges, which apparatus comprises a tank and conveyer of construction similar to that stated.

SOLOMON W. EGBERT.

Witnesses:
EDWIN S. MUNROE,
RHODA M. EGBERT.